Oct. 13, 1959     P. TALMEY ET AL     2,908,419
LINED CONTAINERS AND METHODS OF MAKING THE SAME
Filed June 10, 1955     2 Sheets-Sheet 1
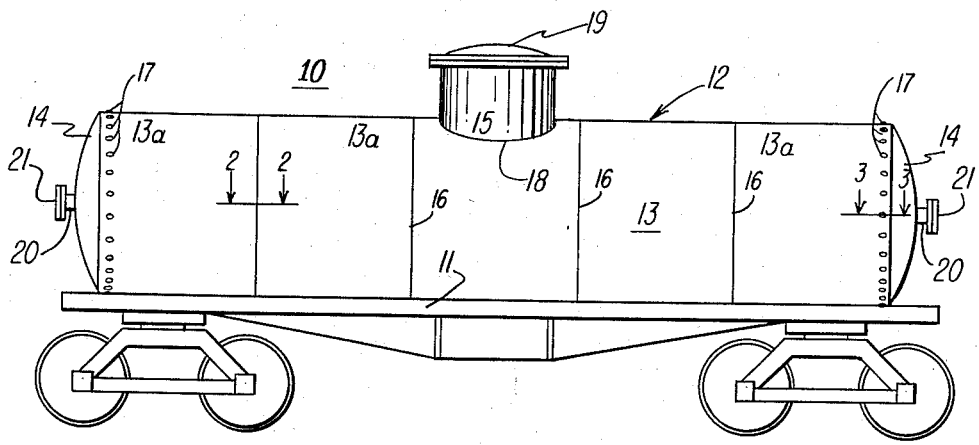
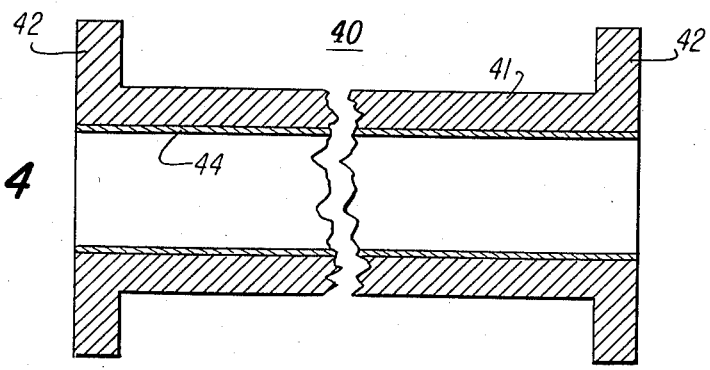
INVENTORS
Paul Talmey
William J. Crehan
BY
Smith, Olsen, Baird & Miller
Attys.

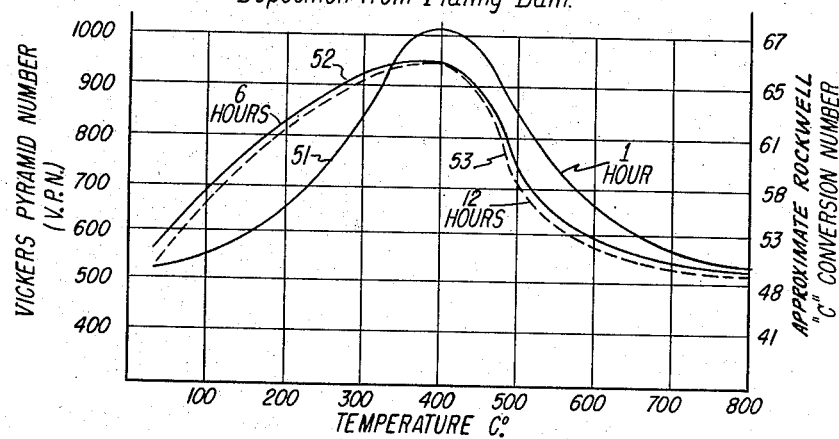
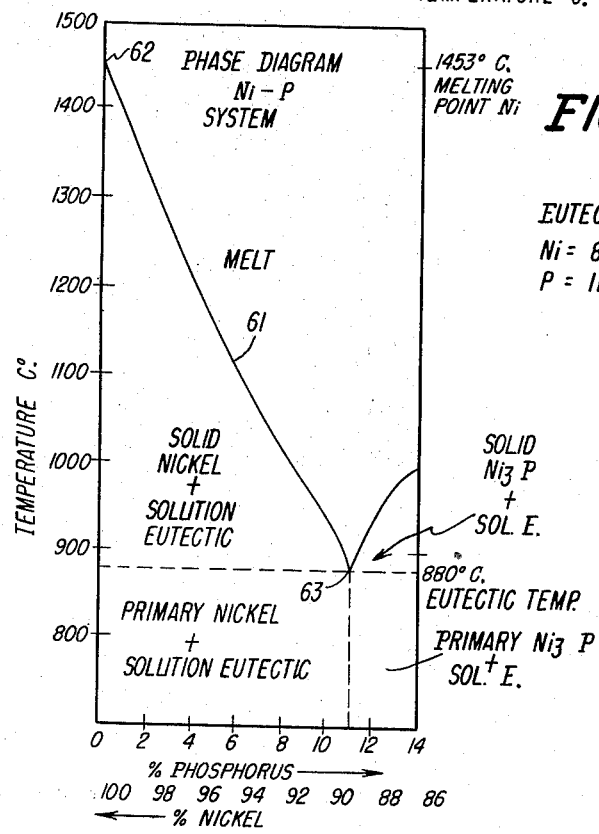

United States Patent Office 2,908,419
Patented Oct. 13, 1959

2,908,419

LINED CONTAINERS AND METHODS OF MAKING THE SAME

Paul Talmey, Barrington, and William J. Crehan, Hinsdale, Ill., assignors to General American Transportation Corporation, Chicago, Ill., a corporation of New York Application June 10, 1955, Serial No. 514,588

23 Claims. (Cl. 220—63)

The present invention relates to lined containers and methods of making the same. This application is a continuation-in-part of the copending application of Paul Talmey and William J. Crehan, Serial No. 299,784, filed July 19, 1952, now Patent No. 2,717,218, granted September 6, 1955.

Heretofore, it has not been commercially practical to manufacture large shipping or storage containers, tanks, or other hollow bodies, having satisfactory interior liners formed fundamentally of nickel, due to the great expense involved in employing nickel-clad steel sheet in the manufacture thereof and due to the total absence of any known method of satisfactory nickel plating of the large interior surfaces involved in such hollow bodies.

Thus, it is a general object of the present invention to provide a shipping or storage container, tank, or other hollow body, that comprises an outer wall formed of steel sheet, or the like, and a smooth continuous seamless and substantially homogeneous inner liner intimately bonded to the interior surfaces of the outer wall and formed essentially of a relatively thin layer of non-corrosive material composed fundamentally of nickel.

Another object of the invention is to provide a container, particularly a shipping container, such as a railway tank car, that comprises a smooth continuous seamless and substantially homogeneous liner of solid material consisting essentially of nickel and phosphorus.

Another object of the invention is to provide a lined tank of the character described, wherein the liner is characterized by adhesion, wear resistance and resistance to corrosive attack by ordinary acids, bases, and other reagents, comparable to electrodeposited nickel, but of economical construction and arrangement.

Another object of the invention is to provide a method of making a lined tank of the character described.

A further object of the invention is to provide a method of coating a metal body with a layer of solid material consisting essentially of nickel and phosphorus and of controlling the physical properties of the coating subsequent to the application thereof to the body.

A further object of the invention is to provide a method of obtaining controlled-hardness of a supported layer of solid material, consisting essentially of nickel and phosphorus, that has been applied to the support by chemical deposition from a plating bath of the nickel cation-hypophosphite anion type.

A further object of the invention is to provide a controlled-hardened supported layer of solid material of the character described.

A further object of the invention is to provide a heat-treatment method, whereby the essential structure of a supported layer of solid material of the character described may be selectively altered to obtain any predetermined and desired physical characteristics thereof within a wide range after the layer has been applied to the support.

A further object of the invention is to provide a supported layer of the character described having any predetermined and desired physical characteristics thereof within the wide range noted.

A further object of the invention is to provide an improved method of coating a metal body with a nickel-phosphorus alloy.

A still further object of the invention is to provide a metal body having an improved coating of nickel-phosphorus alloy.

Further features of the invention pertain to the particular arrangement of the elements of the container, tank or hollow body, and of the steps of the method of making the same, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a side elevational view of a railway tank car provided with a tank body incorporating a liner and embodying the present invention;

Fig. 2 is a greatly enlarged fragmentary sectional view of a portion of the wall of the tank body of the railway car, taken in the direction of the arrows along the line 2—2 in Fig. 1;

Fig. 3 is a greatly enlarged fragmentary sectional view of another portion of the wall of the tank body of the railway car, taken in the direction of the arrows along the line 3—3 in Fig. 1;

Fig. 4 is a fragmentary longitudinal sectional view of a pipe section incorporating a liner and embodying the present invention;

Fig. 5 is a series of curves illustrating the hardness-temperature relationship involved in the heat-treatment of the liner of a hollow body, of the character of that provided in the railway tank car of Fig. 1 or in the pipe section of Fig. 4, in accordance with the method of the present invention; and Fig. 6 is a phase diagram of the nickel-phosphorus system, as far as it is pertinent to the nickel-phosphorus alloys incorporated in the liners of the hollow bodies of the present invention, and illustrating the mutual relationships among phase and temperature and composition in these nickel-phosphorus alloys.

Referring now to Figs. 1 to 3, inclusive, of the drawings, there is illustrated a railway tank car 10 comprising mobile structure 11 carrying a shipping container or tank 12 embodying the features of the present invention. The tank 12, as illustrated, comprises a horizontally extending substantially cylindrical hollow body 13, two end headers 14, and a centrally disposed upstanding substantially cylindrical hollow dome 15. The body 13 includes a number of tubular sections 13a, five being illustrated, that are formed of steel plate and secured by butt-welding at the meeting edges thereof to provide the seams or joints 16, as shown in Fig. 2; while the end headers 14 are also formed of steel plate and secured in lapped relationship by steel rivets 17 to the adjacent end sections 13a, as shown in Fig. 3. Further, the dome 15 is formed of steel plate and secured in a cooperating opening provided in the middle section 13a by arc welding, as indicated at 18. The construction of the tank 12, described above, and involving both welded and riveted joints between the various component elements thereof, is entirely conventional, and altogether arbitrary as a matter of structure, in order clearly to demonstrate the broad and general application of the present invention, as described more fully below.

Continuing now with the construction of the tank 12, the dome 15 carries a removable steel cover 19, and the two end headers 14 are respectively provided with two steel fixtures 20 of tubular form, that, in turn, respectively carry two removable steel covers 21; which fixtures 20 may be employed in filling and in emptying the tank 12, when certain fluids are shipped or stored therein. Finally, the entire interior surfaces of the tank 12 are provided with a smooth continuous seamless and substantially homogeneous liner 22, comprising a solid layer of nickel-phosphorus material and intimately bonded to the interior surfaces mentioned. Also, the liner 22 completely covers the welded seams or joints 16 at the meeting edges of the sections 13a, as illustrated in Fig. 2, and the lapped edges of the end sections 13a and the end headers 14 at the riveted joints therebetween, together with the inner heads of the rivets 17, as illustrated in Fig. 3. Moreover, the liner 22 extends in covering relation with the interior surfaces of the fixtures 20; whereby the liner 22 is of integral one-piece construction throughout and is totally devoid of cracks, seams or discontinuities of any kind whatsoever. Furthermore, the interior surfaces of the covers 19 and 21 are respectively provided with integral one-piece liners, not shown, of the character of the liner 22; whereby the entire interior volume of the tank 12 is completely bounded by the one-piece liner 22, and by the one-piece liners, not shown, respectively carried by the interior surfaces of the covers 19 and 21.

The liner 22 is applied to the interior surfaces of the tank 12 by chemical deposition from a plating bath of the nickel cation-hypophosphite anion type and in accordance with the method disclosed in the previously-mentioned application of Talmey and Crehan; and specifically, after the elements of the tank 12 are assembled and fabricated, in a conventional manner, the interior surfaces thereof are thoroughly degreased, cleaned and lightly pickled in a suitable acid, such as hydrochloric acid. Then the tank 12 is transferred to the apparatus of the Talmey and Crehan application mentioned; whereby it is rotated about its longitudinal axis, and a hot plating bath of the character noted is circulated therethrough to effect the chemical deposition of the one-piece liner 22 upon the interior surfaces that are wetted thereby. The chemical deposition of the liners, not shown, that are carried by the interior surfaces of the covers 19 and 21 proceeds in a similar manner employing a chemical plating bath of the character noted.

More particularly, the chemical plating bath that is employed may be any one of a number of available compositions, such, for example, as disclosed in: U.S. Patent No. 2,532,283, granted on December 5, 1950 to Abner Brenner and Grace E. Riddell, U.S. Patent No. 2,658,841, granted on November 10, 1953 to Gregoire Gutzeit and Abraham Krieg, or U.S. Patent No. 2,658,842, granted on November 10, 1953 to Gregoire Gutzeit and Ernest J. Ramirez. However, it is preferable that this chemical plating bath be of the composition of that disclosed in the copending application of Gregoire Gutzeit, Paul Talmey and Warren G. Lee, Serial No. 569,815, filed March 6, 1956, now Patent No. 2,822,294, granted February 4, 1958, since this particular plating bath is admirably suited to the continuous plating process disclosed in the previously mentioned application of Talmey and Crehan. The chemical plating bath of the Gutzeit, Talmey and Lee application mentioned essentially comprises an aqueous solution of a nickel salt, a hypophosphite, a complexing agent selected from the group consisting of lactic acid and salts thereof, and an exalting additive selected from the group consisting of propionic acid and salts thereof. In this plating bath, the absolute concentration of hypophosphite ions is within the range 0.15 to 1.20 moles/liter, the ratio between nickel ions and hypophosphite ions is within the range 0.25 to 1.60, the absolute concentration of lactic ions is within the range 0.25 to 0.60 mole/liter, the absolute concentration of propionic ions is within the range 0.025 to 0.060 mole/liter, and the pH is within the approximate range 4.0 to 5.6.

In the chemical plating of the interior surfaces of the tank 12 to produce the liner 22, the plating bath is continuously circulated through the tank 12 and through the associated continuous plating system, not shown, with regeneration of the plating bath, as time proceeds, in order to maintain substantially the composition thereof set forth, all as disclosed in the Talmey and Crehan application mentioned. In this method, the temperature of the plating bath in the tank 12 is maintained near the boiling point thereof, at about 210° F., so as to obtain a high plating rate in the production of the liner 22; and the plating step is continued throughout an appropriate time interval in order to obtain the desired thickness of the liner 22, the plating rate of the plating bath mentioned being about 1 mil per hour. Normally the thickness of the liner 22 is at least about ½ mil and usually in the approximate range 1 to 5 mils, a thickness of about 3 mils being recommended for general utility of the railway tank car 10.

The liner 22, as chemically deposited, is in the form of a layer intimately bonded to the interior surfaces of the tank 12, and comprises an amorphous solid material consisting essentially of a metastable undercooled solution of phosphorus in nickel, and including about 88 to 94% nickel and 6 to 12% phosphorus by weight, the liner being characterized by adhesion, wear resistance, and resistance to corrosive attack by ordinary acids, bases, and other reagents, comparable to electrodeposited nickel. As chemically deposited, the liner 22 has a hardness corresponding to a Vickers Pyramid Number (V.P.N.) of about 525.

At this point, it is noted that the liner 22, as chemically deposited, is highly satisfactory for the intended purpose, without any further treatment whatever; and it is emphasized that the material of this liner 22, as chemically deposited, is of the character specified above. The variable composition of the liner 22 with respect to the inclusion of nickel and phosphorus is dependent to a limited extent upon the concentration of the hypophosphite in the plating bath, and also upon the concentration of phosphite in the plating bath, it being understood that as the plating reactions proceed at the catalytic surfaces of the tank 12, the hypophosphite anions are oxidized to phosphite anions as the nickel cations are correspondingly reduced to metallic nickel and deposited upon the catalytic surface of the steel comprising the walls of the tank 12. However, the composition of the liner 22, as chemically deposited, is always within the narrow range specified with respect to the inclusion of nickel and phosphorus by weight. As noted above, the chemical deposition of the liner 22 upon the interior surfaces of the tank 12 involves the catalytic plating reactions mentioned, whereby the base metal of the walls of the tank 12 must be formed of catalytic material. While there are a great number of catalytic materials upon which the chemical deposition may take place, the ordinary catalytic materials which are also satisfactory for the purpose of making such containers or tanks conventionally comprise iron and its alloys, copper and its alloys, and aluminum and its alloys. For example, the metal of the walls of the tank 12 might be formed of: iron, carbon-steel, chrome-steel, cobalt-steel, silicon-steel, manganese-steel, nickel-steel, molybdenum-steel, nickel-cobalt, steel, nickel-chrome steel, chrome-manganese steel, manganese-molybdenum steel, chrome-copper-nickel steel, copper, brass, bronze, silicon-bronze, phosphor-bronze, beryllium - copper, cadmium-copper, chromium - copper, nickel-copper, aluminum, aluminum-brass and aluminum-bronze.

Referring now to Fig. 4, there is illustrated a pipe section 40 embodying the features of the present invention and comprising a longitudinally extending tubular body 41 carrying laterally extending end flanges 42 at the opposite ends thereof and provided with a longitudinally extending tubular liner 44. In the pipe section 40 the body 41 and the end flanges 42 may be formed integrally of cast or forged steel or other catalytic material, as previously explained, and the liner 44 comprises a smooth continuous seamless and substantially homogeneous layer of chemically deposited nickel-phosphorus material of the character previously described and intimately bonded to the interior surfaces of the body 41 and the end flanges 42.

The method of applying the liner 44 by chemical deposition from a plating bath of the nickel cation-hypophosphite anion type is in no material way different from that involved in the above-described method of applying the liner 22, as it is apparent that suitable end plugs, not shown, may be secured to the end flanges 42 to produce a composite container or tank that may be readily received for rotation and chemical plating in the cradle of the plating apparatus disclosed in the Talmey and Crehan application mentioned.

Accordingly, it will be understood that the terms "container" and "tank" as employed herein are intended to cover all those hollow structures that perform a retaining, storing, conveying, etc., function, and embrace a great variety of hollow structures commonly referred to as tubes, pipes, drums, barrels, etc.

Now when it is desirable that the liner that is chemically deposited upon the interior surfaces of a hollow body (the tank 12, the pipe section 40, etc.) have an ultimate hardness that is greater than its original hardness, as chemically deposited, about 525 V.P.N., this may be accomplished by subjecting the liner to subsequent heat-treatment, as explained more fully below. Specifically, the hollow body, following the chemical deposition of the liner upon the interior surfaces thereof, is transferred to a suitable oven or furnace and heated throughout an appropriate time interval in an inert atmosphere, such, for example, as nitrogen, or in a reducing atmosphere, such, for example, as cracked ammonia. This heat-treatment not only effects a controlled-hardness of the liner, as explained more fully hereinafter, but it is also useful in effecting annealing of the steel or other metal of which the outer walls of the hollow body is formed, and including the welded joints, the rivets, etc., therein. In this heat-treatment step it is recommended that the hollow body, as a whole, be mounted upon a suitable cradle in the oven mentioned so that it may be rotated about its longitudinal axis throughout the heat-treatment.

Considering now in greater detail the heat-treatment of the liner, it is first noted in conjunction with Fig. 5 that the essential character and structure of the solid material of the liner is completely altered at a critical temperature of about 400° C., whereby it is exceedingly important that the selection of the heat-treatment temperature be made with full appreciation of this fundamental characteristic of this material. Accordingly, the heat-treatment of the liner will be specifically discussed in two separate phases, the first phase involving the temperature range extending from the ambient temperature up to the critical temperature of 400° C., and the second involving the temperature range extending from the critical temperature of 400° C. up to about 700° C. and below the melting point of the solid material.

Specifically, in the heat-treatment step, the hollow body-liner assembly, mounted upon the cradle mentioned, is placed in the oven and continuously rotated in the inert atmosphere therein; the temperature of the assembly is gradually raised from the ambient temperature to the treatment temperature; the treatment temperature of the assembly is maintained or held throughout a treatment time interval; the temperature of the assembly is gradually reduced from the treatment temperature to about 200° C.; then the assembly, mounted upon the cradle mentioned, is removed from the oven and allowed to cool back to the ambient temperature. At this time, hardness measurements are made in order to determined the V.P.N. of the controlled-hardened liner.

Again referring to the matter of the critical temperature of 400° C., it is pointed out that at this temperature an irreversible change proceeds through the material of the liner; whereby the amorphous solid material consisting essentially of the metastable undercooled solution of phosphorus in nickel is converted into a stable solid material consisting essentially of micro-crystals of nickel phosphide ($Ni_3P$) dispersed in a matrix of nickel, the chemical reaction that is productive of the stability mentioned being exothermic and proceeding with great rapidity throughout the material of the liner.

In the heat-treatment of the liner, involving a treatment temperature below the critical temperature of 400° C., precipitation hardness of the $Ni_3P$ in the metastable solid is involved; whereby the increased hardness effected is substantially directly proportional to the treatment temperature, although it is influenced by the treatment time interval, as clearly demonstrated by the left-hand portions of the curves 51, 52 and 53 in Fig. 5. Thus, it will be understood that when the treatment time interval proceeds for one hour, the increased hardness of the liner follows the left-hand portion of the curve 51; when the treatment time interval proceeds for six hours, the increased hardness of the liner follows the left-hand portion of the curve 52; and when the treatment time interval proceeds for twelve hours, the increased hardness of the liner follows the left-hand portion of the curve 53. By way of illustration, it may be assumed that the treatment time interval of the liner is six hours; whereby the left-hand portion of the curve 52 of Fig. 5 indicates that the V.P.N. of about 525 of the liner is respectively increased to the V.P.N. values of about: 680, 820, 920 and 940, at the respective treatment temperatures of 100° C., 200° C., 300° C. and 395° C. In passing, it is noted that an absolute maximum increase in the V.P.N. of the liner is achieved with a treatment time interval of about one hour and at a treatment temperature of about 395° C. in this temperature range disposed below the critical temperature of 400° C.

In the heat-treatment of the liner, involving a treatment temperature above the critical temperature of 400° C., precipitation hardness of the nickel phosphide in the stable solid is involved; whereby the increased hardness effected is substantially inversely proportional to the treatment temperature, although it is influenced by the treatment time interval, as clearly demonstrated by the right-hand portions of the curves 51, 52 and 53 in Fig. 5. Thus, it will be understood that when the treatment time interval proceeds for one hour, the increased hardness of the liner follows the right-hand portion of the curve 51; when the treatment time interval proceeds for six hours, the increased hardness of the liner follows the right-hand portion of the curve 52; and when the treatment time intervals proceeds for twelve hours, the increased hardness of the liner follows the right-hand portion of the curve 53. By way of illustration, it may be assumed that the treatment time interval of the liner is six hours; whereby the right-hand portion of the curve 52 of Fig. 5 indicates that the initial V.P.N. of about 525 of the liner is respectively increased to the V.P.N. values of about: 940, 750, 590 and 580, at the respective treatment temperatures of 400° C., 500° C., 600° C. and 700° C. In passing, it is noted that an absolute maximum increase in the V.P.N. of the liner is achieved with a treatment time interval of about one hour and at a treatment temperature of about 400° C. in this temperature range disposed above the critical temperature of 400° C.

Also, it is noted that the hardness measurements (productive of the data from which the curves 51, 52 and 53 were plotted) were taken at room temperature from the coatings of 5-mils thickness carried by cold rolled steel samples, the chemical plating and heat-treatment being that previously described or as indicated by curves 51, 52 and 53.

In view of the foregoing, it will be understood that since each of the curves 51, 52 and 53 has the general configuration of a sine function, a predetermined increased value of the V.P.N. of the liner may be achieved either in the temperature range disposed below the critical temperature of 400° C. or in the temperature range disposed above the critical temperature of 400° C. For example, referring to Fig. 5 and assuming that a treatment time interval of one hour is involved, it will be observed that a V.P.N. of 900 may be achieved either in the lower temperature range at a temperature of about 320° C. or in the higher temperature range at a temperature of about 480° C. However, it must be borne in mind that this V.P.N. of 900 is achieved in the lower temperature range by a first mechanism involving $Ni_3P$ precipitation in the metastable solid, and it is achieved in the higher temperature range by a second mechanism involving $Ni_3P$ precipitation in the stable solid; whereby the essential structure of the liner is entirely different in the two cases, except for the hardness characteristic noted. For example, the material of the liner is substantially non-magnetic both as deposited and after being subjected to the heat-treatment in the lower temperature range below the critical temperarure of 400° C.; whereas the material of the liner is considerably magnetic after it has been subjected to the heat-treatment in the upper temperature range above the critical temperature of 400° C. Various oher physical properties of the material of the liner are similarly altered substantially and critically at the critical temperature of 400° C.; for example, the electrical conductivity of the material of the liner is not substantially altered by the heat-treatment in the lower temperature range, but is substantially increased by the heat-treatment in the upper temperature range.

Considering further the heat-treatment of the material of the liner, it is noted that while the essential structure of the material thereof is critically altered, when the material is heated to the critical temperature of 400° C., still a true eutectic composition therein is not achieved until the material is heated to a still higher temperature in order to effect melting thereof, as clearly illustrated by the curve 61 in the phase diagram of the nickel-phosphorus system of Fig. 6. Specifically, in the portion of this system pertinent to the nickel-phosphorus compositions produced by chemical deposition from a plating bath of the nickel cation-hypophosphite anion type, and involving phosphorus in the range 6 to 12% by weight, it was discovered that the eutectic composition comprises nickel and phosphorus constituents containing about 89% nickel and 11% phosphorus by weight, and that the eutectic temperature is about 880° C. On the curve 61, the melting point of nickel (1453° C.) is indicated at 62, and the eutectic point is indicated at 63. Also, from the curve 61, it will be observed that a composition containing about 5% phosphorus has a melting point of about 1150° C., a composition containing about 6% phosphorus has a melting point of about 1100° C., a composition containing about 10% phosphorus has a melting point of about 950° C., and a composition containing about 12% phosphorus has a melting point of about 950° C.

The eutectic composition of the system is not completely understood, since it appears that it involves fundamentally nickel and $Ni_3P$, and since the proportions by weight are not in strict accordance with Dalton's law; however, repeated and accurate analysis always yields this ratio of nickel and phosphorus by weight, and only nickel and $Ni_3P$ have been detected in the alloy.

All of the compositions that are produced by chemical deposition from the plating baths of the nickel cation-hypophosphite anion type contain nickel and phosphorus in the previously mentioned range by weight (about 88–94% nickel and 6–12% phosphorus); and most of the compositions fall in the even more limited range containing about 90–93% nickel and 7–10% phosphorus by weight. Thus, it will be understood that when the material of the liner is heated to a temperature sufficiently high to melt the same, a melt is produced in which the nickel and phosphorus constituents are in equilibrium above the curve 61 of the phase diagram of Fig. 6. Upon subsequent cooling, the melt becomes supersaturated with nickel in the event the phosphorus content of the composition is below 11%; whereas upon subsequent cooling, the melt becomes supersaturated with $Ni_3P$ in the event the phosphorus content of the composition is above 11%. Specifically, in the event there is a deficiency of phosphorus the melt becomes supersaturated with nickel, upon subsequent cooling; whereby solid nickel is formed in the solution of the eutectic as the composition of the solution moves downwardly and toward the right along the curve 61 and toward the eutectic point 63; hence, when the cooling of the melt proceeds to the eutectic temperature of about 880° C., considerable solid nickel is present in the solution of the eutectic composition, so that upon further cooling of the mass, this solid nickel is productive of primary nickel crystals in the mass of the eutectic composition that appear as substantial nickel dendrites dispersed in the fine crystals of nickel and $Ni_3P$ comprising the fundamental constituents of the eutectic composition. Specifically, in the event there is an excess of phosphorus, the melt becomes supersaturated with $Ni_3P$, upon subsequent cooling; whereby solid $Ni_3P$ is formed in the solution of the eutectic as the composition of the solution moves downwardly and toward the left along the curve 61 and toward the eutectic point 63; hence, when the cooling of the melt proceeds to the eutectic temperature of about 880° C., considerable solid $Ni_3P$ is present in the solution of the eutectic composition, so that upon further cooling of the mass, this solid $Ni_3P$ is productive of primary $Ni_3P$ crystals in the mass of the eutectic composition that appear as small crystals of $Ni_3P$ dispersed in the fine crystals of nickel and $Ni_3P$ comprising the fundamental constituents of the eutectic composition. Accordingly, it is the melting of the solid material that is chemically deposited from the plating bath of the nickel cation-hypophosphite anion type, followed by the subsequent cooling and solidifying of the melt, that is productive of the nickel-phosphorus alloy characterized by the eutectic composition having dispersed therein the primary crystals mentioned. As previously noted, in these deposits, there is normally an excess of nickel in the composition, whereby the nickel-phosphorus alloys produced are normally characterized by the dispersion therein of nickel dendrites. Now this alloy comprising the eutectic composition previously mentioned is substantially different as to characteristics and structure from the solid material that results from heat-treatment of the chemically plated material in the temperature range disposed above the critical temperature of 400° C. and below the melting point disposed in the general range 880° C. to 1100° C.

This, it will be understood that in the heat-treatment of the hollow body the solid material of the liner must be melted to effect the production of the nickel-phosphorus alloy characterized by the eutectic described above; and, moreover, since it is not necessary to maintain the condition of the melt for any particular time interval, the melted material of the liner is not flowed from the interior surfaces of the hollow body during the short time interval of the melted condition thereof, due fundamentally to the fact that the hollow body is continuously rotated about its longitudinal axis during this heat-treatment, as previously explained. Also, it is pointed out that the melt possesses an unusual wetting characteristic; whereby upon subsequent cooling and solidifying thereof, the resulting coating or liner is also intimately bonded to the interior surfaces of the hollow body. As a matter of fact, the adhesion of the liner to the interior surfaces of the hollow body is substantially improved by the formation of the nickel-phosphorus alloy, characterized by the eutectic as described above. Furthermore, the nickel-phosphorus alloy has physical properties that are unique and substantially different with respect to: the initial solid nickel-phosphorus material that is chemically deposited, the solid material that results from the heat-treatment of the initial material in the lower temperature range disposed between the ambient temperature and 395° C., and the solid material that results from the heat-treatment of the initial material in the upper temperature range disposed between 400° C. and just below the melting point thereof (about 880° C. to 1100° C.). For example, in the nickel-phosphorus alloy, both the magnetic characteristic and the electrical conductivity of the nickel-phosphorus material are substantially increased.

Hence, it will be understood that the solid material of the liner that is chemically deposited from the plating bath of the nickel cation-hypophosphite anion type upon the interior surfaces of the hollow body may ultimately be of any one of four distinct types, depending upon whether heat-treatment thereof is involved, and upon the character of the heat-treatment employed. For purpose of discussion, the solid material may be classified as follows:

*Type I.*—The solid material that is chemically deposited upon the catalytic surface of the supporting body, prior to heat-treatment, comprises an amorphous solid consisting essentially of a metastable undercooled solution of phosphorus in nickel and including about 88 to 94% nickel and 6 to 12% phosphorus by weight.

*Type II.*—The solid material of type I is converted into the solid material of type II by heat-treatment in the temperature range extending from the ambient temperature up to a temperature just below the critical temperature of 400° C. This solid material of type II is essentially the same as that of type I, except that there is some precipitation of $Ni_3P$ therein.

*Type III.*—The solid material of type II is converted into the solid material of type III by heat-treatment in the temperature range extending from the critical temperature of 400° C. to a temperature just below the melting point thereof (about 880° C. to 1100° C., depending upon composition). This solid material of type III is essentially different from the solid material of type II, in that it is a stable solid, and is characterized by the presence of substantial micro-crystals of $Ni_3P$ dispersed in the matrix of nickel.

*Type IV.*—The solid material of type III is converted into the solid material of type IV (the nickel-phosphorus alloy involving the eutectic composition) by heat-treatment to effect the melting thereof (880° C. to 1100° C. depending upon composition); whereby upon subsequent cooling and solidifying of the melt, the nickel-phosphorus alloy is formed that is characterized by the eutectic noted and that is also ordinarily characterized by the dispersion of the nickel dendrites in the eutectic composition thereof.

Now the solid material of type I comprises the initial chemical deposit that is produced upon the catalytic surface from the plating bath of the nickel cation-hypophosphite anion type and has the characteristic composition with respect to nickel and phosphorus content previously noted; and the solid materials of types II, III and IV are produced directly from the solid material of type I, depending upon the heat-treatment, as explained above; whereby each of these solid materials comprises the same characteristic composition with respect to nickel and phosphorus content.

In view of the foregoing, it is apparent that after a liner has been chemically deposited upon the interior surfaces of a hollow body, a wide variety of particular physical properties and characteristics may be induced therein by precisely controlled heat-treatment in accordance with the present method and depending fundamentally upon the conversion of the solid material of type I successively into the solid materials of types II, III and IV in the final form of the liner. Also, it is noted that the solid material of each of types I, II, III and IV is admirably suited to use in a liner in contact with various and sundry fluids comprising foods, chemicals, etc., that would normally etch or corrode the base metal of the walls of the hollow body, since each of these materials is characterized by adhesion, wear resistance and resistance to corrosive attack by ordinary acids, bases, and other reagents, at least comparable (in fact, superior) to electrodeposited nickel; the materials of types II and III being considerably harder than electrodeposited nickel when heat treated at a temperature in the particular temperature range embracing the vicinity of the critical temperature of 400° C.

As previously explained, the solid material of type I is entirely satisfactory as a liner for most hollow bodies, whereby the heat-treatment described above is normally employed only in the event that the additional peculiar physical properties and characteristics of the materials of types II, III and IV are required or desired. Moreover, the heat-treatments required in order to effect the conversion of the solid material of type II into the solid material of type III or the conversion of the solid material of type III into the solid material of type IV involve temperatures that are considerably in excess of those to which it is permissible to subject the walls of some hollow bodies; which situation prevails with respect to the railway tank car 10. However, with respect to the pipe section 40, the temperatures involved in the heat-treatments to obtain the materials of types III and IV would not be considered excessive. In other words, the matter of the possible conversion of the solid material of type I into the solid materials of types II, III and IV must be examined from the standpoint of whether the temperature involved in the required heat-treatment is within the range to which the base metal of the walls of the hollow body may be subjected, without damage thereto, or to the fabricated hollow body.

The unusual wetting characteristic of the melt that is productive of the material of type IV, the nickel-phosphorus alloy characterized by the eutectic noted, is unique in that the phosphorus constituent thereof renders it possible to wet and to bond with respect to base metals containing a substantial content of chromium, such, for example, as chrome-steel, nickel-chrome-steel, etc.; which, of course, is altogether impossible in other conventional coating operations, due to the interference of the chromic oxide that is always present upon the surfaces of such alloys, and regardless of the cleaning steps that may be employed. It is believed that this peculiar wetting characteristic involves the ability of the phosphorus ingredient of the melt to reduce the chromic oxide present upon the surface of the chrome-alloy, since it is definitely the chromic oxide upon the surfaces of such alloys, that normally prevents the carrying out of conventional coating operations. This unusual wetting characteristic of the melt mentioned is by no means confined to chrome-alloys, and is of great utility when the base metal of the hollow body includes aluminum and its alloys, that also tend to form surface oxides that substantially interfere with wetting and bonding in conventional coating operations.

Accordingly, the fundamental coating method of the present invention is in no way limited to the lining of containers, tanks, or other hollow bodies, as it is generally useful in coating metal bodies, whereby it may be the exterior surface of a metal body that is coated to avoid undesirable corrosion thereof or to obtain the required hardness or other physical characteristic of the nickel-phosphorus layer supported thereby.

As previously explained, the material of type I is substantially non-magnetic, whereas the material of type IV is substantially magnetic; whereby there are peculiar applications of the liner to a hollow body wherein it is not desirable that the surface of the liner in contact with the contained material be magnetic; whereby the liner itself should be of composite construction comprising an inner layer formed of type IV material intimately bonded to the supporting base metal and an outer layer formed of type I material. This composite construction is very readily obtained by virtue of the fact that the material of type IV is catalytic, since it comprises the nickel-phosphorus alloy previously described.

Accordingly, in making a hollow body of the character described immediately above, after the heat-treatment step that is productive of the liner comprising the material of type IV, the hollow body is again returned to the plating system, whereby the chemical plating is resumed in the manner previously described, so that the additional or outer layer of the liner presently applied by chemical deposition is formed of the material of type I. Hence, the composite liner thus applied to the supporting base metal comprises the inner layer formed of the material of type IV and the outer surface layer formed of the material of type I.

In view of the foregoing, it will be appreciated that the railway tank car 10 and the pipe section 40 are useful in the transportation and storage of a wide variety of fluids that cannot be permitted to have direct contact with the steel of the walls thereof; whereby the ranges of utility of these hollow bodies are greatly extended; and are substantially wider than those attained with other types of liners that have been employed heretofore, and including such lining materials as: rubber, glass, organic plastics, etc., since it is obvious that many chemicals have selective corrosive or other deleterious actions upon such lining materials, aside from many other objectionable physical properties thereof. Also, it will be understood that the hollow bodies of the present invention are by no means limited to utilization in the fundamental transportation of such fluids, as these hollow bodies may comprise parts of stationary chemical treatment or reaction apparatus, involving corrosive reagents, and widely used in industry.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A hollow container comprising a wall defined by one or more steel sheets securely joined together at the meeting edges thereof, and a smooth continuous seamless and substantially homogeneous heat-hardened layer of solid material intimately bonded to the interior surfaces of both said one or more sheets and said one or more joints therebetween and in covering relation therewith and having a thickness of at least about ½ mil, the material of said layer comprising about 88 to 94% nickel and 6 to 12% phosphorus by weight and constituting a stable solid characterized by the presence of substantial micro-crystals of nickel phosphide dispersed in a matrix of nickel and having a resulting hardness within the approximate range 1000 V.P.N to 575 V.P.N., said layer also constituting a liner for said container and being also characterized by adhesion, wear resistance and resistance to corrosive attack by ordinary acids, bases, and other reagents, comparable to electrodeposited nickel.

2. A tank comprising a wall defined by a plurality of steel plates secured together by welded joints, and a smooth continuous and substantially homogeneous heat-hardened layer of solid material intimately bonded to the interior surfaces of both said plates and said welded joints therebetween and in covering relation therewith and having a thickness of at least about ½ mil, the material of said layer comprising about 88 to 94% nickel and 6 to 12% phosphorus by weight and constituting a stable solid characterized by the presence of substantial micro-crystals of nickel phosphide dispersed in a matrix of nickel and having a resulting hardness within the approximate range 1000 V.P.N to 575 V.P.N., said layer also constituting a liner for said tank and being also characterized by adhesion, wear resistance and resistance to corrosive attack by ordinary acids, bases, and other reagents, comparable to electrodeposited nickel.

3. In a railway tank car, a tank comprising a wall defined by a plurality of steel plates securely joined together, and a smooth continuous seamless and substantially homogneous heat-hardened layer of solid material intimately bonded to the interior surfaces of both said plates and said joints therebetween and in covering relation therewith and having a thickness of at least about ½ mil, the material of said layer comprising about 88 to 94% nickel and 6 to 12% phosphorus by weight and consistuting a stable solid characterized by the presence of substantial micro-crystals of nickel phosphide dispersed in a matrix of nickel and having a resulting hardness within the approximate range 1000 V.P.N. to 575 V.P.N., said layer also constituting a liner for said tank car and being also characterized by adhesion, wear resistance and resistance to corrosive attack by ordinary acids, bases, and other reagents, comparable to electrodeposited nickel.

4. A hollow container comprising a wall defined by one or more steel sheets securely joined together at the meeting edges thereof, and a smooth continuous seamless and substantially homogeneous heat-hardened layer of solid material intimately bonded to the interior surfaces of both said one or more sheets and said one or more joints therebetween and in covering relation therewith and having a thickness of at least about ½ mil, the material of said layer consisting essentially of nickel phosphide crystals dispersed in a matrix of nickel and including about 88 to 94% nickel and 6 to 12% phosphorus by weight and constituting a stable solid characterized by the presence of substantial micro-crystals of nickel phosphide dispersed in a matrix of nickel and having a resulting hardness within the approximate range 1000 V.P.N. to 575 V.P.N., said layer also constituting a liner for said container and being also characterized by adhesion, wear resistance and resistance to corrosive attack by ordinary acids, bases, and other reagents comparable to electrodeposited nickel.

5. The method of lining the interior surfaces of a hollow container comprising a wall defined by one or more steel sheets securely joined together at the meeting edges thereof; which method comprises cleaning the interior surfaces of both said one or more sheets and said one or more joints therebetween, applying a smooth continuous seamless and substantially homogeneous layer of solid material to said cleaned surfaces and in covering relation therewith and of a thickness of at least about ½ mil, said layer being applied by chemical deposition from a plating bath of the nickel cation-hypophosphite anion type, the material of said layer comprising an amorphous solid and consisting essentially of a metastable undercooled solution of phosphorus in nickel and including about 88 to 94% nickel and 6 to 12% phosphorus by weight, and heating said sheets and said layer to a temperature in the approximate range 100° C. to 400° C. throughout a time interval of at least about 1 hour in order to effect hardening of said layer, said layer constituting a liner for said container and characterized by adhesion, wear resistance and resistance to corrosive attack by ordinary acids, bases, and other reagents, comparable to electrodeposited nickel.

6. The method of lining the interior surfaces of a hollow container comprising a wall defined by one or more steel sheets securely joined together at the meeting edges thereof; which method comprises cleaning the interior surfaces of both said one or more sheets and said one or more joints therebetween, applying a smooth continuous seamless and substantially homogeneous layer of solid material to said cleaned surfaces and in covering relation therewith and of a thickness of at least about ½ mil, said layer being applied by chemical deposition from a plating bath of the nickel cation-hypophosphite anion type, the material of said layer comprising an amorphous solid consisting essentially of a metastable undercooled solution of phosphorous in nickel and including about 88 to 94% nickel and 6 to 12% phosphorus by weight, and heating said sheets and said layer to a temperature in the approximate range 400° C. to 880° C. throughout a time interval of at least about 1 hour, whereby upon subsequent cooling of said layer the metastable solid material thereof has been converted into a stable solid material consisting essentially of nickel phosphide crystals dispersed in a matrix of nickel, said layer constituting a liner for said container and characterized by adhesion, wear resistance and resistance to corrosive attack by ordinary acids, bases, and other reagents, comparable to electrodeposited nickel.

7. The method of effecting the controlled hardness of a supported liner of solid material that has been chemically deposited upon the interior surfaces of a hollow container from a plating bath of the nickel cation-hypophosphite anion type, wherein said liner has a thickness of at least about ½ mil and the material thereof as deposited comprises an amorphous solid consisting essentially of a metastable undercooled solution of phosphorus in nickel and including about 88 to 94% nickel and 6 to 12% phosphorus by weight; said method comprising heating said liner and maintaining the temperature thereof in the approximate range 100° C. to 395° C. and definitely below 400° C. throughout a time interval of at least about one hour, whereby the material of said liner remains an amorphous solid material consisting essentially of a metastable undercooled solution of phosphorus in nickel, and whereby upon subsequent cooling to the ambient temperature the hardness of said liner has been increased by nickel phosphide precipitation from an initial value of about 525 V.P.N. to a final value within the approximate range 600 to 1000 V.P.N., wherein said final V.P.N. value in said V.P.N. range is generally directly proportional to said maintained temperature in said temperature range.

8. The method set forth in claim 7, wherein said liner is arranged in an inert atmosphere during said heating step.

9. The method of effecting the controlled hardness of a supporting liner of solid material that has been chemically deposited upon the interior surfaces of a hollow container from a plating bath of the nickel cation-hypophosphite anion type, wherein said liner has a thickness of about at least ½ mil and the material thereof as deposited comprises an amorphous solid consisting essentially of a metastable undercooled solution of phosphorus in nickel and including about 88 to 94% nickel and 6 to 12% phosphorus by weight; said method comprising heating said liner and maintaining the temperature thereof in the approximate range 400° C. to 800° C. throughout a time interval of at least about one hour, whereby the metastable solid material of said liner is converted into a stable solid material consisting essentially of nickel phosphide crystals dispersed in a matrix of nickel, and whereby upon subsequent cooling to the ambient temperature the hardness of said liner has been increased by nickel phosphide precipitation from an initial value of about 525 V.P.N. to a final value within the approximate range 1000 V.P.N. to 575 V.P.N., wherein said final V.P.N. value in said V.P.N. range is generally inversely proportional to said maintained temperature in said temperature range.

10. The method set forth in claim 9, wherein said liner is arranged in an inert atmosphere during said heating step.

11. The method of treating a supported liner of solid material that has been chemically deposited upon the interior surfaces of a hollow container from a plating bath of the nickel cation-hypophosphite anion type, wherein said liner has a thickness of at least about ½ mil and the material thereof as deposited comprises an amorphous solid consisting essentially of a metastable undercooled solution of phosphorus in nickel and including about 90 to 93% nickel and 7 to 10% phosphorus by weight; said method comprising heating said liner to a temperature in the approximate range 950° C. to 1100° C. and sufficiently high to melt the same, whereby upon subsequent cooling and solidfying of said liner the amorphous solid material thereof has been converted into a nickel-phosphorus alloy characterized by the dispersion of nickel dendrites in the eutectic composition thereof, said eutectic composition comprising constituents containing about 89% nickel and 11% phosphorus by weight and having an eutectic temperature of about 880° C.

12. The method set forth in claim 11, wherein said liner is arranged in an inert atmosphere during said melting step.

13. The method of lining the interior surfaces of a hollow metal container with nickel-phosphorus alloy; which method comprises cleaning the interior surfaces of said container, applying a layer of solid material upon said cleaned surfaces and in covering relation therewith and of a thickness of at least about ½ mil, wherein the material of said layer comprises an amorphous solid consisting essentially of a metastable undercooled solution of phosphorus in nickel and including about 88 to 94% nickel and 6 to 12% phosphorus by weight and having a melting point well below that of the metal of said container said layer being applied by chemical deposition from a plating bath of the nickel cation-hypophosphite anion type, and heating said layer to a temperature sufficiently high selectively to melt the same and to effect the flow of the resulting melt into wetting and bonding relation with said cleaned surfaces, whereby upon subsequent cooling and solidifying of said layer the amorphous solid material thereof has been converted into a nickel-phosphorus alloy characterized by an eutectic composition comprising constituents containing about 89% nickel and 11% phosphorus by weight and having an eutectic temperature of about 880° C., and whereby said solidified layer constitutes a lining for said container.

14. The method of lining the interior surfaces of a hollow metal container comprising cleaning the interior surfaces of said container, applying a smooth continuous seamless and substantially homogeneous layer of solid material to said cleaned surfaces and in covering relation therewith and of a thickness of at least about ½ mil, said layer being applied by chemical deposition from a plating bath of the nickel cation-hypophosphite anion type and intimately bonded to said cleaned surfaces, the material of said layer comprising an amorphous solid and consisting essentially of a metastable undercooled solution of phosphorus in nickel and including about 88 to 94% nickel and 6 to 12% phosphorus by weight, and then heating said body and said layer to a controlled temperature in the approximate range 100° C. to 1100° C. throughout a time interval of at least about 1 hour in order selectively to establish desired physical properties in said layer, whereby said layer constitutes a lining for said container and possesses said established physical properties.

15. The method of lining the interior surfaces of a hollow metal container comprising cleaning the interior surfaces of said container, applying a smooth continuous seamless and substantially homogeneous layer of solid material to said cleaned surfaces and in covering relation therewith and of a thickness of at least about ½ mil, said layer being applied by chemical deposition from a plating bath of the nickel cation-hypophosphite anion type and intimately bonded to said cleaned surfaces, the material of said layer comprising an amorphous solid and consisting essentially of a metastable undercooled solution of phosphorus in nickel and including about 88 to 94% nickel and 6 to 12% phosphorus by weight, rotating said container and said layer about an axis thereof, and heating said container and said layer during rotation thereof and maintaining a controlled temperature thereof in the approximate range 100° C. to 1100° C. throughout a time interval of at least about 1 hour in order selectively to establish desired physical properties in said layer, whereby said layer constitutes a lining for said container and possesses said established physical properties.

16. The method of lining a hollow metal container comprising cleaning the interior surfaces of said container, applying a smooth continuous seamless and substantially homogeneous layer of solid material to said cleaned surfaces and in covering relation therewith and of a thickness of at least about ½ mil, said layer being applied by chemical deposition from a plating bath of the nickel cation-hypophosphite anion type and intimately bonded to said cleaned surfaces, the material of said layer comprising an amorphous solid and consisting essentially of a metastable undercooled solution of phosphorus in nickel and including about 88 to 94% nickel and 6 to 12% phosphorus by weight, and subjecting said container and said layer to heat treatment so that the temperature thereof is gradually increased from the ambient temperature to a treatment temperature in the approximate range 100° C. to 1100° C. and the treatment temperature thereof is maintained for a treatment time interval of at least about 1 hour and then the temperature thereof is gradually decreased back to the ambient temperature in order to establish desired physical properties in said layer, whereby said layer constitutes a lining for said container and possesses said established physical properties.

17. The method set forth in claim 16, wherein said heat treatment step is carried out in an inert atmosphere.

18. The method set forth in claim 16, wherein said treatment time interval is in the approximate range 1 to 12 hours.

19. The method of lining a hollow metal container comprising cleaning the interior surfaces of said container, applying a layer of solid material to said cleaned surfaces and in covering relation therewith and of a thickness of at least about ½ mil by chemical deposition from a plating bath of the nickel cation-hypophosphite anion type, the material of said layer comprising an amorphous solid and consisting essentially of a metastable undercooled solution of phopshorus in nickel and including about 88 to 94% nickel and 6 to 12% phosphorus by weight and having a melting point well below that of the metal of said body, and heating said container and said layer to a temperature sufficiently high selectively to melt said layer and to flow the resulting melt into wetting and bonding relation with said cleaned surfaces, whereby upon subsequent cooling and solidifying of said layer the amorphous solid material thereof has been converted into a nickel-phosphorus alloy characterized by an eutectic composition comprising nickel and phosphorus constituents containing about 89% nickel and 11% phosphorus by weight and having an eutectic temperature of about 880° C.

20. The method set forth in claim 19, wherein the metal of said container contains sufficient chromium substantially to interfere with wetting and bonding by a substantially pure nickel layer.

21. The method set forth in claim 19, wherein the metal of said container is a chromium-iron alloy.

22. The method set forth in claim 19, wherein the metal of said container is a nickel-chromium-iron alloy.

23. The method of lining a hollow metal container comprising applying a first layer of nickel-phosphorus material to the interior surfaces of said container and in covering relation therewith and of a thickness of at least about ½ mil by chemical deposition from a plating bath of the nickel cation-hypophosphite anion type, subjecting said first layer to heat-treatment to convert the same into a nickel-phosphorus alloy, and then applying a second layer of nickel-phosphorus material to the surface of said first layer and in covering relation therewith and of a thickness of at least about ½ mil by chemical deposition from a plating bath of the type specified, said nickel-phosphorus material as chemically deposited comprising an amorphous solid consisting essentially of a metastable undercooled solution of phosphorus in nickel and including about 88 to 94% nickel and 6 to 12% phosphorus by weight, said alloy comprising about 88 to 94% nickel and 6 to 12% phosphorus by weight and characterized by an eutectic composition comprising nickel and phosphorus constituents containing about 89% nickel and 11% phosphorus by weight and having an eutectic temperature of about 880° C.

References Cited in the file of this patent

UNITED STATES PATENTS

| | | |
|---|---|---|
| 2,346,423 | Gray | Apr. 11, 1944 |
| 2,568,111 | Bond | Sept. 18, 1951 |
| 2,581,310 | Sweo | Jan. 1, 1952 |
| 2,633,631 | Horvitz | Apr. 7, 1953 |
| 2,717,218 | Talmey et al. | Sept. 6, 1955 |

FOREIGN PATENTS

| | | |
|---|---|---|
| 3,009 | Great Britain | A.D. 1880 |
| 231,635 | Great Britain | Apr. 9, 1925 |

OTHER REFERENCES

"Deposition of Nickel," Nov. 1947, 39 Journal of Research of the National Bureau of Standards, pp. 385, 392.

UNITED STATES PATENT OFFICE
CERTIFICATE OF CORRECTION

Patent No. 2,908,419                                                                 October 13, 1959

Paul Talmey et al.

It is hereby certified that error appears in the printed specification of the above numbered patent requiring correction and that the said Letters Patent should read as corrected below.

Column 12, line 13, for "consistuting" read -- constituting --; column 13, line 44, for "supporting" read -- supported --.

Signed and sealed this 29th day of March 1960.

(SEAL)
Attest:

KARL H. AXLINE                                                      ROBERT C. WATSON
Attesting Officer                                                 Commissioner of Patents